(12) United States Patent
Rizzardini (10) Patent No.: US 11,150,090 B2
(45) Date of Patent: Oct. 19, 2021

(54) MACHINE LEARNING ZERO-RATE LEVEL CALIBRATION

(71) Applicant: STMicroelectronics S.r.l., Agrate Brianza (IT)

(72) Inventor: Federico Rizzardini, Settimo Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 583 days.

(21) Appl. No.: 16/059,701

(22) Filed: Aug. 9, 2018

(65) Prior Publication Data

US 2020/0049504 A1 Feb. 13, 2020

(51) Int. Cl.
| | |
|---|---|
| G01C 19/02 | (2006.01) |
| G01C 19/5776 | (2012.01) |
| G06F 17/16 | (2006.01) |
| G01K 15/00 | (2006.01) |
| G06F 17/18 | (2006.01) |

(52) U.S. Cl.
CPC ......... *G01C 19/02* (2013.01); *G01C 19/5776* (2013.01); *G01K 15/002* (2013.01); *G06F 17/16* (2013.01); *G06F 17/18* (2013.01); *G01K 2213/00* (2013.01)

(58) Field of Classification Search
CPC .. G01C 19/02; G01C 19/5776; G01C 25/005; G06F 17/16; G06F 17/18; G01K 15/002; G01K 2213/00; G01D 3/028; G06N 20/00

See application file for complete search history.

(56) References Cited

U.S. PATENT DOCUMENTS

| | | | | |
|---|---|---|---|---|
| 5,527,003 A | * | 6/1996 | Diesel | G01C 21/16 244/195 |
| 2015/0276783 A1 | | 10/2015 | Palella et al. | |
| 2019/0293451 A1 | * | 9/2019 | Cook | G01C 19/00 |

OTHER PUBLICATIONS

"Polynomial regression," Wikipedia, retrieved on Apr. 10, 2018 from https://en.wikipedia.org/wiki/Polynomial_regression, 4 pages.
"UM2181—Getting started with MotionGC gyroscope calibration library in X-CUBE-MEMS1 expansion for STM32Cube," User manual, Rev 3, Mar. 2018, 15 pages.
"X-CUBE-MEMS1—Sensor and motion algorithm software expansion for STM32Cube," Data brief, DocID027116 Rev 10, Nov. 2017, 4 pages.

* cited by examiner

*Primary Examiner* — Xin Y Zhong
(74) *Attorney, Agent, or Firm* — Seed IP Law Group LLP (57) ABSTRACT

One or more embodiments are directed to zero-rate level compensation systems. One such system includes stationary detection circuitry that receives gyroscope signals output by a gyroscope and determines whether the gyroscope is stationary based on the gyroscope signals. The stationary detection circuitry generates a stationary gyroscope signal indicating the gyroscope is stationary based on a determination that the gyroscope is stationary. A temperature sensor senses temperature and outputs temperature signals. Zero-rate level estimation circuitry receives the stationary gyroscope signal and a temperature signal associated with the stationary gyroscope signal, and iteratively estimates one or more zero-rate level compensation parameters based on the stationary gyroscope signal and the temperature signal.

21 Claims, 4 Drawing Sheets

MACHINE LEARNING ZERO-RATE LEVEL CALIBRATION

BACKGROUND

Technical Field

The present disclosure generally relates to zero-rate level calibration of a gyroscope output, and more specifically to techniques to compensate for zero-rate level drift in gyroscope output signals.

Description of the Related Art

Gyroscopes are devices that measure or maintain rotational motion. MEMS (microelectromechanical system) gyroscopes are small, inexpensive sensors that measure angular velocity. The units of angular velocity are typically measured in degrees per second (o/s) or revolutions per second (RPS).

Zero-rate level describes the actual output signal of a gyroscope if there is no angular rate present. That is, even when the gyroscope is stationary, it may output a signal indicating a non-zero angular rate. Zero-rate level is sometimes referred to as offset calibration error.

The zero-rate level of gyroscopes, in at least some instances, may be a result of stress to the gyroscope sensor and therefore the zero-rate level can slightly change after mounting the sensor onto a printed circuit board or after exposing it to extensive mechanical stress. The zero-rate level may change or "drift" over temperature and time.

Prior approaches to reduce the impact of the zero-rate level in the gyroscope output signal generally address only one component of drift, e.g., either drift over temperature or drift over time. In one approach, a gyroscope may be calibrated during or immediately after manufacture by applying a thermal cycle and calculating a curve that approximates the zero-rate level over temperature. However, this approach is static and does not facilitate dynamic updating of the zero-rate level, for example, over the lifetime of the gyroscope during actual use. Additionally, factory calibration of a gyroscope has a high cost, in terms of at least testing equipment, time, and labor involved in the factory calibration.

BRIEF SUMMARY

The present disclosure is generally directed to devices, systems, and methods that utilize machine learning or iterative zero-rate level (ZRL) estimations to compensate for ZRL drift in a gyroscope output. In an embodiment, stationary detection circuitry receives gyroscope signals and determines whether the gyroscope signals indicate that the gyroscope is stationary. If the gyroscope is determined to be stationary, then the stationary detection circuitry passes the gyroscope signals (e.g., stationary gyroscope signals) to ZRL estimation circuitry. At the same time, a temperature sensor senses the temperature of the device or the gyroscope, and the gyroscope signals may be synchronized or otherwise associated with the temperature signals, so that the temperature of the device or gyroscope may be determined at the time that corresponding gyroscope signals are received.

In an embodiment, the ZRL estimation circuitry estimates one or more zero-rate level compensation parameters based on the stationary gyroscope signals and the corresponding temperature signals. The ZRL estimation circuitry utilizes machine-learning or iterative techniques to iteratively update the one or more zero-rate level compensation parameters as new stationary gyroscope and corresponding new temperature signals are received. Accordingly, as the ZRL of the gyroscope drifts over time and over temperature ranges, the compensation parameters output by the ZRL estimation circuitry are iteratively updated. The compensation parameters are supplied to gyroscope compensation circuitry which dynamically compensates the gyroscope output signals based on the compensation parameters, and outputs the compensated gyroscope signals. Thus, in an embodiment, calibration of the gyroscope output may be updated, even if the device is moving and even if the temperature is changing.

In one embodiment, the present disclosure provides a system that includes a gyroscope, stationary detection circuitry, a temperature sensor, and zero-rate level estimation circuitry. The stationary detection circuitry receives gyroscope signals output by the gyroscope, determines whether the gyroscope is stationary based on the gyroscope signals, and generates a stationary gyroscope signal based on a determination that the gyroscope is stationary. The temperature sensor senses temperature and outputs temperature signals. The zero-rate level estimation circuitry receives the stationary gyroscope signal and a temperature signal associated with the stationary gyroscope signal, and iteratively estimates one or more zero-rate level compensation parameters based on the stationary gyroscope signal and the temperature signal.

In an embodiment, the present disclosure provides a method that includes: receiving gyroscope signals from a gyroscope; receiving temperature signals from a temperature sensor; associating the temperature signals with the gyroscope signals; determining whether the gyroscope is stationary based on the gyroscope signals; generating a stationary gyroscope signal in response to determining that the gyroscope is stationary; and iteratively estimating, by zero-rate level estimation circuitry, one or more zero-rate level compensation parameters based on the stationary gyroscope signal and a temperature signal associated with the stationary gyroscope signal.

In an embodiment, the present disclosure provides a device that includes a microprocessor and a zero-rate level compensation system coupled to the microprocessor. The zero-rate level compensation system includes a gyroscope, stationary detection circuitry, a temperature sensor, and zero-rate level estimation circuitry. The stationary detection circuitry receives gyroscope signals output by the gyroscope, determines whether the gyroscope is stationary based on the gyroscope signals, and generates a stationary gyroscope signal based on a determination that the gyroscope is stationary. The temperature sensor senses temperature and outputs temperature signals. The zero-rate level estimation circuitry receives the stationary gyroscope signal and a temperature signal associated with the stationary gyroscope signal, and iteratively estimates one or more zero-rate level compensation parameters based on the stationary gyroscope signal and the temperature signal.

In an embodiment, the present disclosure provides a device that includes one or more computer-readable memories, and zero-rate level compensation circuitry coupled to the one or more computer-readable memories. The zero-rate level compensation circuitry, in operation: receives gyroscope signals from a gyroscope; receives temperature signals from a temperature sensor; associates the temperature signals with the gyroscope signals; determines whether the gyroscope is stationary based on the gyroscope signals; generates a stationary gyroscope signal in response to determining that the gyroscope is stationary; and iteratively estimates one or more zero-rate level compensation parameters based on the stationary gyroscope signal and a temperature signal associated with the stationary gyroscope signal.

BRIEF DESCRIPTION OF THE SEVERAL VIEWS OF THE DRAWINGS

In the drawings, identical reference numbers identify similar elements or acts unless the context indicates otherwise. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

In the present description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

Figure 1:
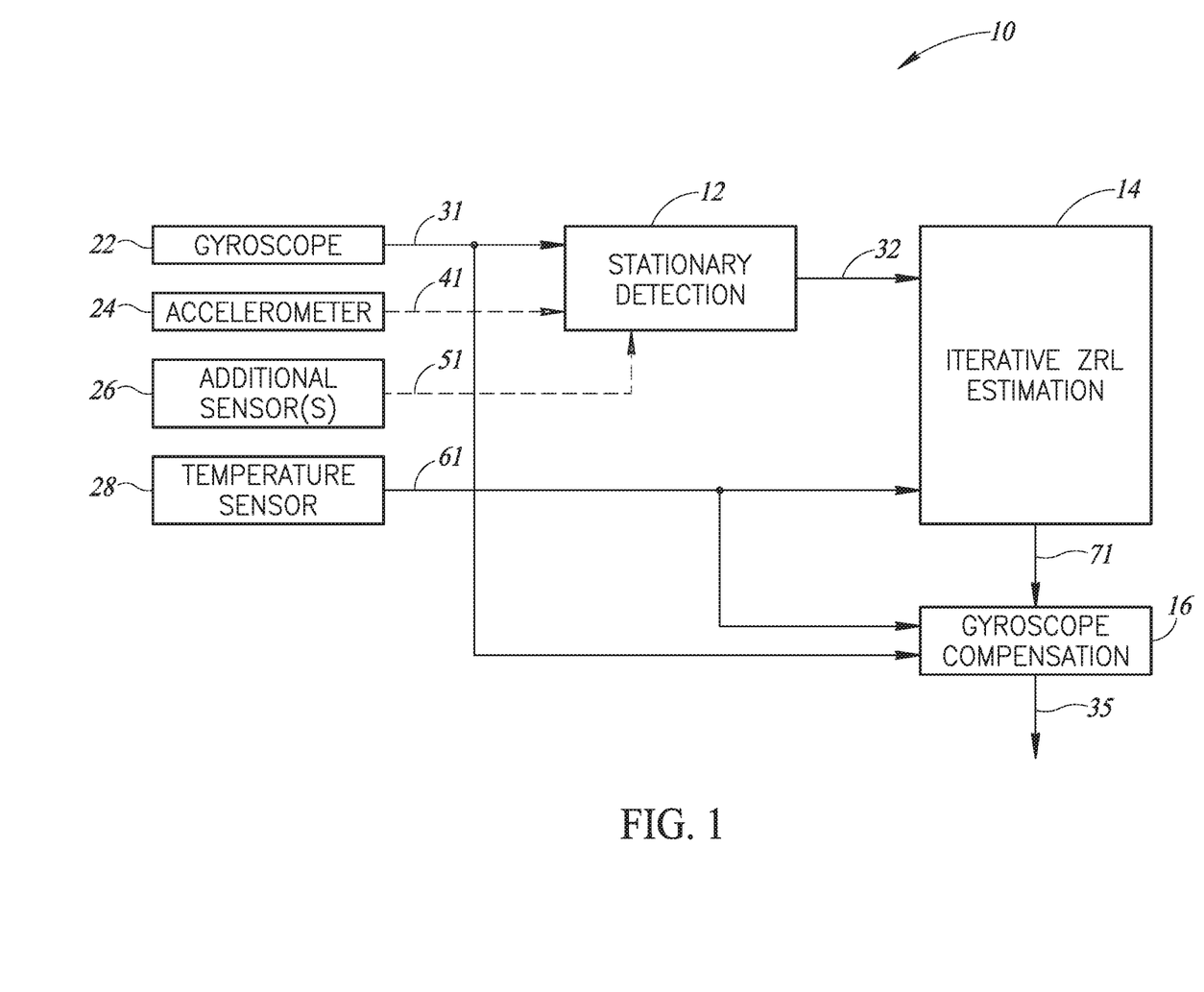
FIG. 1 is a functional block diagram illustrating a zero-rate level compensation device, in accordance with one or more embodiments of the present disclosure.

Turning now to FIG. 1, illustrated therein is a functional block diagram illustrating a zero-rate level (ZRL) compensation system 10 (which may be referred to herein as "system 10"), in accordance with one or more embodiments of the present disclosure.

The system 10 includes stationary detection circuitry 12, iterative ZRL estimation circuitry 14 (which may be referred to herein as "ZRL estimation circuitry 14"), and gyroscope compensation circuitry 16.

The stationary detection circuitry 12 receives gyroscope signals 31 output by a gyroscope 22, and determines whether the gyroscope 22 is stationary based on the gyroscope signals 31. In one or more embodiments, the stationary detection circuitry 12 determines whether the gyroscope 22 is stationary based on a comparison of the received gyroscope signals 31 with historical gyroscope data, which may include labeled sensor data (e.g., labeled to indicate that the associated gyroscope data represents stationary gyroscope data), statistical data, or any other historical gyroscope data that may indicate a stationary state of the gyroscope 22. The stationary detection circuitry 12 may calculate an absolute value associated with the received gyroscope signals 31 and may compare the calculated absolute value with the historical gyroscope data to determine whether the gyroscope signals 31 indicate that the gyroscope 22 is stationary.

In one or more embodiments, the stationary detection circuitry 12 includes or is otherwise coupled to computer-readable memory (see memory 306 of FIG. 4) which stores the historical gyroscope data. The historical gyroscope data may include, for example, gyroscope mean and variance data associated with the historical gyroscope data. The stationary detection circuitry 12 may thus determine whether the gyroscope 22 is stationary based on a comparison of the current gyroscope signals 31 to the gyroscope mean and variance data. For example, the stationary detection circuitry 12 may determine that the gyroscope 22 is stationary if the current gyroscope signals 31 have values that are below threshold mean and variance values.

In one or more embodiments, the system includes an accelerometer 24, and the stationary detection circuitry 12 determines whether the gyroscope 22 is stationary based further on accelerometer signals 41 received from the accelerometer 24. For example, the stationary detection circuitry 12 may determine that the gyroscope 22 is stationary if the accelerometer signals 41 have values that are below threshold mean and variance values for accelerometer data, in addition to the gyroscope signals 31 having values that are below threshold mean and variance values for gyroscope data. In some embodiments, the system 10 may be or include a six degree of freedom (6DOF) inertial measurement unit (IMU) that includes the gyroscope 22 and the accelerometer 24, each of which may sense respective parameters (e.g., rotation or acceleration) about three axes. The stationary detection circuitry 12 may further receive signals 51 from one or more additional sensors 26, and may determine whether the gyroscope 22 is stationary based on the signals 51 received from the additional sensors 26. The additional sensors 26 may be or include, for example, any motion sensor, orientation sensor, magnetism sensor, or the like which output signals 51 that may be utilized to determine whether the device incorporating the system 10 is stationary. For example, the additional sensors 26 may include one or more of a magnetometer and a global navigation satellite system (GNSS) sensor or receiver circuitry, or the like. In some embodiments, the system 10 may be or include a nine degree of freedom (9DOF) IMU that includes the gyroscope 22, the accelerometer 24, and an additional sensor 26 (e.g., a magnetometer), each of which may sense respective parameters about three axes.

In some embodiments, the system 10 may include conditioning or pre-filtering circuitry (not shown) positioned between the stationary detection circuitry 12 and the gyroscope 22, accelerometer 26, additional sensors 26 and/or the temperature sensor 28. The conditioning or pre-filtering circuitry operably filters noise from the outputs of the various sensors (i.e., gyroscope 22, accelerometer 26, additional sensors 26 and/or temperature sensor 28).

The stationary detection circuitry 12 generates a stationary gyroscope signal 32 in response to determining that the gyroscope 22 is stationary. In one or more embodiments, the stationary detection circuitry 12 outputs the received gyroscope signal 31 as the stationary gyroscope signal 32, if the stationary detection circuitry 12 determines that the gyroscope 22 is stationary based on the received gyroscope signal 31. That is, the stationary detection circuitry 12 outputs as stationary gyroscope signals only those gyroscope signals 31 that indicate the device incorporating the system 10 is stationary, while gyroscope signals 31 that indicate the device is not stationary are not output as stationary gyroscope signals 31. As used herein, the term stationary gyroscope signal 32 may refer to gyroscope data that is received in the gyroscope signals 31 and which is included in a signal generated by the stationary detection circuitry 12, for example, in response to determining that the gyroscope signals 31 indicate that the gyroscope 22 is stationary.

In some embodiments, the stationary detection circuitry 12 may generate a binary signal that indicates, e.g., by its associated binary value, whether a received gyroscope signal 31 indicates that the gyroscope 22 is stationary, and the stationary detection circuitry 12 may output the generated binary signal along with the received gyroscope signal. For example, in response to determining that the gyroscope 22 is stationary, the stationary detection circuitry 12 may generate as the stationary gyroscope signal 32 the binary signal having a high value (e.g., a logical "1") and the corresponding received gyroscope signal 31 (or corresponding gyroscope measurement data extracted from or otherwise indicated by the received gyroscope signal 31) from which the stationary detection circuitry 12 determined that the gyroscope 22 is stationary.

The stationary detection circuitry 12 outputs the stationary gyroscope signal 32 to the iterative zero-rate level (ZRL) estimation circuitry 14 (which may be referred to herein as "ZRL estimation circuitry 14"), which will be described in further detail later herein.

The system 10 further includes a temperature sensor 28 that senses a temperature of the gyroscope 22 and outputs temperature signals 61 to the ZRL estimation circuitry 14. The temperature signals 61 may be associated with the gyroscope signals 31 output by the gyroscope 22. For example, each of the gyroscope signals 31 may have an associated temperature signal 61, which indicates a temperature of the gyroscope 22 at the time the gyroscope signal 31 is generated or output by the gyroscope 22 or at the time the gyroscope signal 31 is received by the stationary detection circuitry 12 or the ZRL estimation circuitry 14. The temperature signals 61 may be associated with the gyroscope signals 31, for example, by a time stamp or other label that may be appended to or otherwise associated with the temperature signals 61 and the gyroscope signals 31. In various embodiments, one or more of the gyroscope 22, the temperature sensor 28, the stationary detection circuitry 12, and the ZRL estimation circuitry 14 may include time stamp circuitry operable to time stamp the gyroscope signals 31 and/or the temperature signals 61.

The ZRL estimation circuitry 14 receives the stationary gyroscope signal 32 and the temperature signal 61 associated with the stationary gyroscope signal 32, and estimates one or more zero-rate level compensation parameters based on the stationary gyroscope signal 32 and the temperature signal 61.

In one or more embodiments, the ZRL estimation circuitry 14 includes circuitry to implement an iterative least-square regression algorithm, which generates the one or more zero-rate level compensation parameters. In particular, the ZRL estimation circuitry receives as input couples composed of a stationary gyroscope measurement, e.g., the stationary gyroscope signal 32, and a corresponding temperature measurement, e.g., the temperature signal 61 associated with the particular stationary gyroscope signal 32. The couples may be 25 referred to as couples {g, t} where g is the gyroscope signal 32 and t is the associated temperature signal 61.

In an embodiment, the ZRL estimation circuitry 14 implements an iterative least-square polynomial regression variant of the closed form solution, which is in matrix form according to the following equation (1):

$$\beta = (X^T X)^{-1} X^T Y$$

The matrix X is fed with temperature data, e.g., with the temperature signals 61, and the matrix Y is fed with the particular stationary gyroscope signals 32 associated with the temperature signals 61. $\beta$ is a column vector containing the solution, e.g., the coefficients of the polynomial model. Thus, the output of the ZRL estimation circuitry 14 may be the coefficients of the polynomial model as provided the column vector $\beta$, which may be referred to as the zero-rate level compensation parameters.

The iterative least-square polynomial regression implemented by the ZRL estimation circuitry 14 may be a polynomial regression of any degree, e.g., the polynomial may be any $n^{th}$ order polynomial, where n is equal to or greater than one. Below, the implementation by the ZRL estimation circuitry 14 of two different cases will be described: a simple case (e.g., a linear regression, where the polynomial is a first order polynomial), and a generalized case (e.g., where the polynomial is any $n^{th}$ order polynomial).

Simple Case: Linear Regression (Straight Line Solution)

The simple case of implementation of the iterative least-square polynomial regression employs a linear regression. In the linear regression case, the ZRL estimation circuitry 14 may model the zero-rate level of the gyroscope 22 as a function having a linear relationship with respect to the temperature, according to the following equation (2):

$$zrl = \beta_1 * t + \beta_0$$

Since the couples {g, t} are composed of gyroscope measurements when the gyroscope 22 is stationary (e.g., the stationary gyroscope signals 32), the measurements, g, will be an estimate of zero-rate level at the associated temperature measurement. Thus, equation (2) can be re-written as the following equation (3):

$$g=\beta_1 * t + \beta_0$$

For the linear regression case, closed form solution components, e.g., the matrices X and Y and the column vector β will now be described.

The X matrix is composed of m temperature measurements, with row entries as follows: $X_i=[1\ t_i]$, where $X_i$ is the i-th row entry. The X matrix may be provided by the following equation (4):

$$X = \begin{bmatrix} 1 & t_1 \\ 1 & t_2 \\ \vdots & \vdots \\ 1 & t_m \end{bmatrix}$$

The Y matrix is a column vector and is composed of m measurements, with row entries as follows: $Y_i=[g_i]$, where $Y_i$ is the i-th row entry. The Y column vector may be provided by the following equation (5):

$$Y = \begin{bmatrix} g_1 \\ g_2 \\ \vdots \\ g_m \end{bmatrix}$$

The β column vector contains the solutions parameters of the linear regression, e.g., the slope and the intercept of the straight line, and the straight line is an estimate of the relationship between the zero-rate level of the gyroscope 22 and temperature. The β column vector may be provided by the following equation (6):

$$\beta = \begin{bmatrix} \beta_0 \\ \beta_1 \end{bmatrix}$$

For each new stationary gyroscope signal 32, a new couple {g, t} including the new stationary gyroscope signal 32 and an associated temperature signal 61 is provided to the ZRL estimation circuitry 14. The ZRL estimation circuitry 14 iteratively updates the least-square regression using the new couples {g, t}, which includes updating the X matrix, the Y matrix, and the solutions contained in the β column vector.

For each new couple, e.g., the i-th couple $\{g_i, t_i\}$, the ZRL estimation circuitry 14 iteratively updates the least-square regression of equation (1) as follows.

First, the ZRL estimation circuitry 14 calculates $X^TX$ at step i, denoted here as $\tilde{X}_i$, in an iterative manner according to, for example, the following equation (7):

$$\tilde{X}_i = \tilde{X}_{i-1} + [1 t_i]^T[1 t_i]$$

Next, the ZRL estimation circuitry 14 calculates $X^TY$ at step i, denoted here as $\tilde{Y}_i$, in an iterative manner according to, for example, the following equation (8):

$$\tilde{Y}_i = \tilde{Y}_{i-1} + [1 t_i]^T[g_i]$$

Then, the ZRL estimation circuitry 14 inverts the matrix $\tilde{X}_i$ and multiplies the resulting inverted matrix by $\tilde{Y}_i$ to obtain the solution $\tilde{\beta}_i$, which is the β column vector after the i-th iteration of the least-square regression. The index i denotes the step i of the regression (e.g., the i-th couple {g, t} used for the regression).

The solution parameters, e.g., as contained in the β column vector, are output by the ZRL circuitry 14 as zero-rate level compensation parameters 71, which are provided to the gyroscope compensation circuitry 16.

The gyroscope compensation circuitry 16 receives the compensation parameters 71 and also receives the gyroscope signals 31 output by the gyroscope 22. The gyroscope compensation circuitry 16 compensates the received gyroscope signals 31 based on the zero-rate level compensation parameters 71.

More particularly, the gyroscope compensation circuitry 16 may estimate the zero-rate level of the received gyroscope signals 31 by calculating the zero-rate level at the associated temperature of the gyroscope signals 31 based on the zero-rate level compensation parameters (e.g., as contained in the β column vector) and the temperature signal 61 associated with the gyroscope signals 31 using equation (2), above. The gyroscope compensation circuitry 16 may then subtract the estimated zero-rate level ($zrl_i$) (e.g., the calculated zero-rate level for an i-th gyroscope signal $g_i$) from the received gyroscope signals 31 to produce a compensated gyroscope signal 35 (e.g., $\bar{g}_i$), according to the following equation (9):

$$\bar{g}_i = g_i - zrl_i$$

The compensated gyroscope signal 35 is output by the gyroscope compensation circuitry 16, and may be provided to any other circuitry, processor, controller, or any other component, device, or the like, which performs one or more operations based on the compensated gyroscope signal 35.

Generalized Case: Polynomial Regression

As noted previously herein, the iterative least-square polynomial regression implemented by the ZRL estimation circuitry 14 may be a polynomial regression of any $n^{th}$ order polynomial. For example, in some instances, the zero-rate level behavior over temperature may be better modeled by a higher degree polynomial. Accordingly, in one or more embodiments, the ZRL estimation circuitry 14 may implement a generalized iterative least-square polynomial regression, in which the zrl behavior over temperature may be modeled according to the following equation (10):

$$g = \beta_n t^n + \ldots + \beta_2 t^2 + \beta_1 t + \beta_0$$

For the generalized polynomial regression, the closed form solution components, e.g., the matrices X and Y and the column vector β will now be described.

The X matrix is composed of m temperature measurements, with row entries as follows: $X_i=[1\ t_i\ \ldots\ t_i^n]$, where $X_i$ is the is the i-th row entry. The X matrix may be provided by the following equation (11):

$$X = \begin{bmatrix} 1 & t_1 & \ldots & t_1^n \\ 1 & t_2 & \ldots & t_2^n \\ \vdots & \vdots & \vdots & \vdots \\ 1 & t_m & \ldots & t_m^n \end{bmatrix}$$

The Y matrix is a column vector composed of m measurements, with row entries as follows: $Y_i=[g_i]$, where $Y_i$ is the i-th row entry. The Y column vector may be provided by the following equation (12) (which is the same as equation (5) for the linear regression case):

$$Y = \begin{bmatrix} g_1 \\ g_2 \\ \vdots \\ g_m \end{bmatrix}$$

The β column vector contains the solutions parameters of the polynomial regression, e.g., the coefficients of the polynomial model. The β column vector may be provided by the following equation (13):

$$\beta = \begin{bmatrix} \beta_0 \\ \beta_1 \\ \vdots \\ \beta_n \end{bmatrix}$$

For each new stationary gyroscope signal 32, a new couple {g, t} including the new stationary gyroscope signal 32 and an associated temperature signal 61 is provided to the ZRL estimation circuitry 14. The ZRL estimation circuitry 14 iteratively updates the least-square regression using the new couples {g, t}, which includes updating the X matrix, the Y matrix, and the solutions contained in the β column vector.

For each new couple, e.g., the i-th couple $\{g_i, t_i\}$, the ZRL estimation circuitry 14 iteratively updates the least-square regression of equation (1) as follows.

First, the ZRL estimation circuitry 14 calculates $X^T X$ at step i, denoted here as $\tilde{X}_i$, in an iterative manner, for example, according to the following equation (14):

$$\tilde{X}_i = \tilde{X}_{i-1} + [1 t_i \ldots t_i^n]^T [1 t_i \ldots t_i^n]$$

Next, the ZRL estimation circuitry 14 calculates $X^T Y$ at step i, denoted here as $\tilde{Y}_i$, in an iterative manner, for example, according to the following equation (15):

$$\tilde{Y}_i = \tilde{Y}_{i-1} + [1 t_i \ldots t_i^n]^T [g_i]$$

Then, the ZRL estimation circuitry 14 inverts the matrix $\tilde{X}_i$ and multiplies the resulting inverted matrix by $\tilde{Y}_i$ to obtain the solution $\tilde{\beta}_i$, which is the β column vector after the i-th iteration of the least-square regression. The index i denotes the step i of the regression (e.g., the i-th couple {g, t} used for the regression).

As in the linear regression case, in the generalized regression case the solution parameters, e.g., as contained in the β column vector, are output by the ZRL circuitry 14 as zero-rate level compensation parameters 71, which are provided to the gyroscope compensation circuitry 16.

The gyroscope compensation circuitry 16 receives the compensation parameters 71 and also receives the gyroscope signals 31 output by the gyroscope 22 as well as temperature signals 61 output by the temperature sensor 28. The gyroscope compensation circuitry 16 compensates the received gyroscope signals 31 based on the zero-rate level compensation parameters 71.

More particularly, the gyroscope compensation circuitry 16 may estimate the zero-rate level of the received gyroscope signals 31 by calculating the zero-rate level at the associated temperature of the gyroscope signals 31 based on the zero-rate level compensation parameters (e.g., as contained in the β column vector) and the temperature signal 61 associated with the gyroscope signals 31 using the following equation (16):

$$zrl = \beta_n t^n + \ldots + \beta_2 t^2 + \beta_1 t + \beta_0$$

The gyroscope compensation circuitry 16 may then subtract the estimated zero-rate level ($zrl_i$) (e.g., the calculated zero-rate level for an i-th gyroscope signal $g_i$) from the received gyroscope signals 31 to produce a compensated gyroscope signal 35 (e.g., $\bar{g}_i$), according to equation (9):

$$\bar{g}_i = g_i - zrl_i$$

The compensated gyroscope signal 35 is output by the gyroscope compensation circuitry 16, and may be provided to any other circuitry, processor, controller, or any other component, device, or the like, which performs one or more operations based on the compensated gyroscope signal 35.

Figure 2:
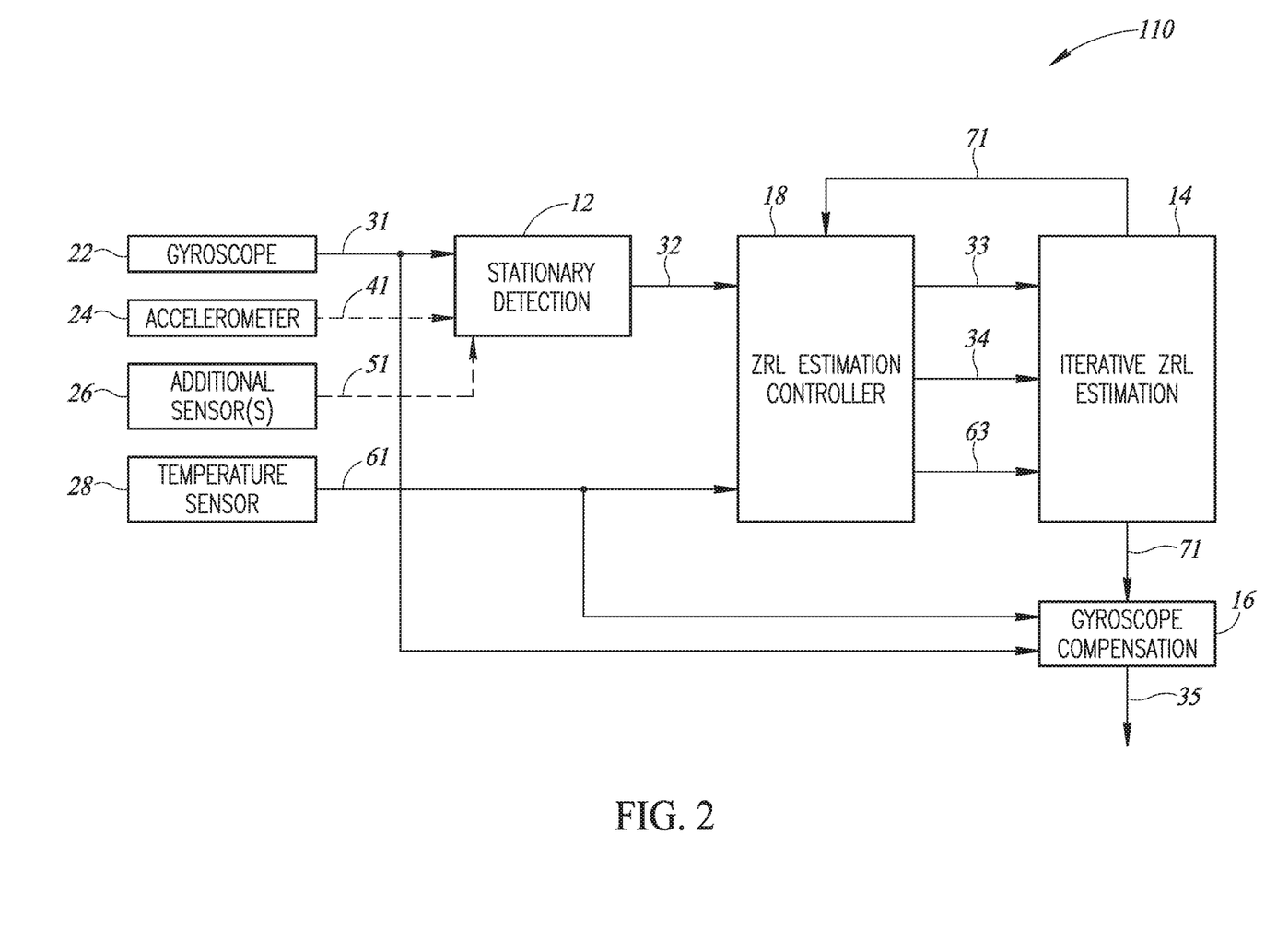
FIG. 2 is a functional block diagram illustrating a zero-rate level compensation system including a zero-rate level estimation controller, in accordance with one or more embodiments of the present disclosure.

FIG. 2 is a functional block diagram illustrating a ZRL compensation system 110 including a zero-rate level estimation controller, in accordance with one or more embodiments of the present disclosure. The system 110 shown in FIG. 2 is substantially the same as the system 10 shown in FIG. 1 except that the system 110 further includes the ZRL estimation controller 18.

The ZRL estimation controller 18 is coupled between the stationary detection circuitry 12 and the ZRL estimation circuitry 14, as shown in FIG. 2.

In use, the ZRL estimation controller 18 receives the stationary gyroscope signals 32 output by the gyroscope 22 and the temperature signals 61 which are output by the temperature sensor 28 and are associated with the stationary gyroscope signals 32. The ZRL estimation controller 18 operatively controls the iterative least-square regression performed by the ZRL estimation circuitry 14, for example, by controlling the updating of the $\tilde{X}_i$ and $\tilde{Y}_i$ matrices. More generally, the ZRL estimation controller 18 determines whether a newly received couple {g, t} will be used to update the model, e.g., the zero-rate level compensation parameters as contained in the β column vector, utilized to estimate the zero-rate level for the gyroscope 22 output.

In one or more embodiments, the ZRL estimation controller 18 passes a couple {g, t} to the ZRL estimation circuitry 14 only if the temperature signal in the couple represents a change in temperature which exceeds a threshold amount. In some embodiments, the ZRL estimation controller 18 may be a programmable controller, and the threshold amount may be programmed or selected, for example, by a user. The amount of change in temperature may be measured with respect to a temperature represented by the temperature signal of a previous couple {g, t}. Alternatively, the amount of change in temperature may be measured with respect to a base-line temperature value, which may be, for example, a mean temperature over some range of temperatures represented by a plurality of couples {g, t}. As an example, the base-line temperature may be 25° C. and the threshold amount may be 5° C. In such a case, the ZRL estimation controller 18 only passes a received couple {g, t} to the ZRL estimation circuitry 14 if the temperature signal of the couple represents a temperature less than 20° C. or greater than 30° C. This is provided only as an example, and in various embodiments, the threshold amount of temperature change may be any value, for example, 1° C., 3° C., 5° C., 10° C. or any other value.

In one or more embodiments, the zero-rate level compensation parameters 71 are supplied to the ZRL estimation controller 18 from the ZRL estimation circuitry 14, and the ZRL estimation controller 18 may determine whether to pass a couple {g, t} to the ZRL estimation circuitry 14 based on the zero-rate level compensation parameters 71.

In some embodiments, the ZRL estimation controller 18 stores the received stationary gyroscope signals and associated temperature signals (e.g., the couples {g, t}) in a buffer or memory. For example, the ZRL estimation controller 18 may include or otherwise access a computer-readable memory, which the ZRL estimation controller 18 may use as a buffer to store the couples {g, t}. In this way, the ZRL estimation controller 18 can keep track of the couples {g, t} that are passed to the ZRL estimation circuitry 14 and that are used to estimate the zero-rate level compensation parameters.

In some embodiments, when the ZRL estimation controller 18 receives a new couple {g, t}, i.e., a new stationary gyroscope signal 32 and associated temperature signal 61, the ZRL estimation controller 18 determines whether the new couple {g, t} represents a new estimate of a previous couple {g, t} that has already been stored in the buffer. That is, the ZRL estimation controller 18 may determine whether gyroscope signal of the new couple has changed with respect to a gyroscope signal of a previous couple having a same or similar temperature value. For example, the ZRL estimation controller 18 may determine whether the temperature signal of the new couple {g, t} represents a temperature that is within a threshold range with respect to a prior temperature signal of a prior couple {g, t} that is stored in the buffer. The threshold range may be any value, and may be selected based on a desired application. For example, the threshold range may be 1° C., 3° C., 5° C., 10° C. or any other value. In high temperature variation applications, the threshold range may be selected to be higher than the value of the threshold range for lower temperature variation applications.

If the temperature signal of the new couple {g, t} represents a temperature that is within the threshold range with respect to a prior temperature signal of a prior couple {g, t} that is stored in the buffer, the ZRL estimation controller 18 may substitute the new couple {g, t} for the prior couple {g, t} in the buffer, so that the new couple {g, t} is used by the ZRL estimation circuitry 14 in estimating the zero-rate level compensation parameters, while the prior couple {g, t} may be removed from the estimation. That is, the ZRL estimation controller 18 may output the new stationary gyroscope signal and the new temperature signal to the ZRL estimation circuitry, and may delete from the buffer the prior temperature signal and the prior stationary gyroscope signal associated with the prior temperature signal. This facilitates compensating for zero-rate level hysteresis over temperature. The ZRL estimation controller 18 may apply a time stamp to all of the received couples {g, t}, which allows the ZRL estimation controller to distinguish a new couple {g, t} from an old couple {g, t}.

In order to delete a previous couple, denoted here as {$g_{old}$, $t_{old}$}, from the model used to estimate the zero-rate level compensation parameters, in one or more embodiments the ZRL estimation controller 18 may access the previous couple, e.g., from the buffer, and may change the sign of operation (e.g., from a plus sign to a minus sign) associated with the previous couple, and supply this to the ZRL estimation circuitry 14. This is represented in FIG. 2 by signal 34, which represents a previous couple that has its sign of operation changed (e.g., from plus to minus) and is supplied by the ZRL estimation controller 18 to the ZRL estimation circuitry 14.

The ZRL estimation circuitry 14 may then subtract the previous couple {$g_{old}$, $t_{old}$} from the regression matrix $\tilde{X}_i$ using the same equation (14) (e.g., in the generalized case) above; however, since the sign of operation for the previous couple has changed from a plus sign to a minus sign, the equation may be implemented by the following equation (15):

$$\tilde{X}_i = \tilde{X}_{i-1} - [1 t_{old} \ldots t_{old}^n]^T [1 t_{old} \ldots t_{old}^n]$$

The previous couple {$g_{old}$, $t_{old}$} is further deleted from the column vector $\tilde{Y}_i$ using the equation (15), which with the sign of operation being changed from a plus sign to a minus sign may be implemented by the following equation (16):

$$\tilde{Y}_i = \tilde{Y}_{i-1} - [1 t_{old} \ldots t_{old}^n]^T [g_{old}]$$

Before or after removing the old couple {$g_{old}$, $t_{old}$}, the new couple may be provided to the ZRL estimation circuitry 14 and included in the iterative estimation of the zero-rate level compensation parameters in the same way as previously described herein.

In some embodiments, the ZRL estimation controller 18 may delete an old couple {$g_{old}$, $t_{old}$} without replacing it with a new couple {g, t}. For example, the ZRL estimation controller 18 may delete couples after some threshold period of time has elapsed from the time that the couple was acquired. That is, if the old couple {$g_{old}$, $t_{old}$} is too old, it may be deleted by the ZRL estimation controller 18. In such embodiments, the ZRL estimation controller 18 may compare, for example, a time stamp associated with the old couple {$g_{old}$, $t_{old}$} with a threshold period of time to determine whether the old couple {$g_{old}$, $t_{old}$} will be deleted.

In FIG. 2, the stationary gyroscope signals that are passed by the ZRL estimation controller 18 to the ZRL estimation circuitry 14 are represented by signal 33, and the corresponding temperature signals, e.g., the temperature signals in a couple {g, t} that is passed by the ZRL estimation controller 18, are represented by signal 63. The stationary gyroscope signals 33 passed by the ZRL estimation controller 18 may be a subset of the stationary gyroscope signals 32 that are received by the ZRL estimation controller 18, since the ZRL estimation controller 18 passes only couples {g, t} meeting certain conditions, such as the temperature signal representing a change in temperature that exceeds a threshold amount. Similarly, the temperature signals 63 that are passed by the ZRL estimation controller 18 may be a subset of the temperature signals 61 that are receive by the ZRL estimation controller 18, since the ZRL estimation controller 18 in some embodiments passes only those temperature signals that are associated with a stationary gyroscope signal 33.

The ZRL estimation circuitry 14 outputs the zero-rate level compensation parameters 71, which are provided to the gyroscope compensation circuitry 16 as previously described herein. The gyroscope compensation circuitry 16 receives the compensation parameters 71, the gyroscope signals 31 output by the gyroscope 22 and the temperature signals 61 output by the temperature sensor 28, and compensates the received gyroscope signals 31 based on the zero-rate level compensation parameters 71. The compensated gyroscope signal 35 is then output by the gyroscope compensation circuitry 16.

In various embodiments, one or more of the stationary detection circuitry 12, the ZRL estimation controller 18, the ZRL estimation circuitry 14 and/or the gyroscope compensation circuitry 16 may be embedded in or otherwise formed on a same chip, for example, as part of a microcontroller or microcontroller unit (MCU). In some embodiments, one or more of the stationary detection circuitry 12, the ZRL estimation controller 18, the ZRL estimation circuitry 14 and/or the gyroscope compensation circuitry 16 may be implemented at least in part as software that loadable or executable by one or more hardware structures, such as a microcontroller unit (MCU), microprocessor, application processor, or the like.

In some embodiments, the zero-rate level compensation parameters 71 output by the ZRL estimation circuitry 14 may be stored in computer-readable memory, such as random-access memory (RAM), which may be included in or otherwise accessible by the ZRL estimation circuitry 14. The ZRL estimation circuitry 14 may thus update and/or use the stored zero-rate level compensation parameters by accessing them in the memory.

Figure 3:
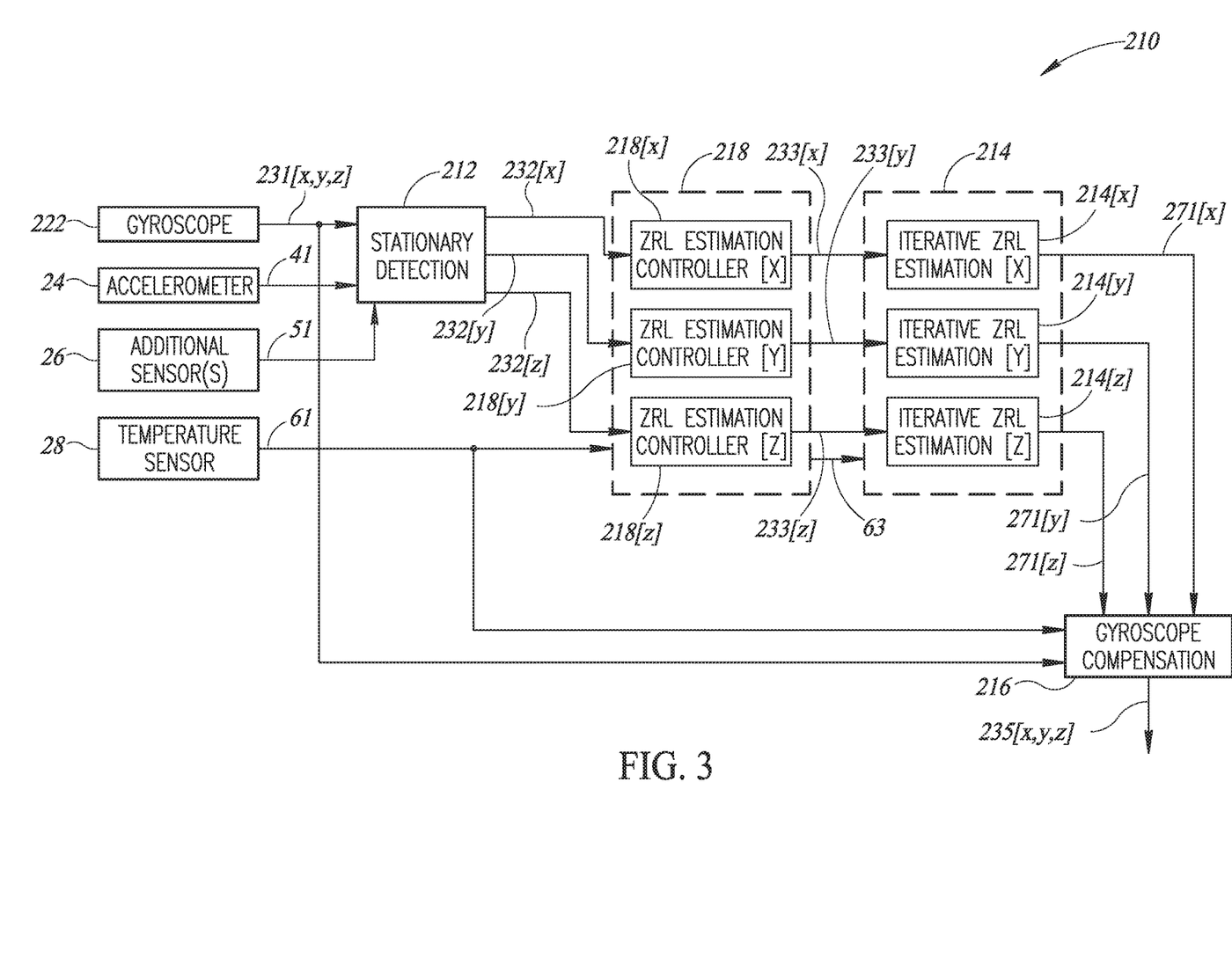
FIG. 3 is a functional block diagram illustrating a ZRL compensation system including a tri-axial gyroscope, in accordance with one or more embodiments of the present disclosure.

FIG. 3 is a functional block diagram illustrating a ZRL compensation system 210 including a tri-axial gyroscope 222, in accordance with one or more embodiments of the present disclosure. The system 210 shown in FIG. 3 is similar in many respects to the system 110 shown in FIG. 2 except that the system 210 includes a tri-axial gyroscope 222, and the ZRL estimation controller 218 and the ZRL estimation circuitry 214 include three separate controllers and estimation circuitry, respectively, which correspond to the three separate sensing axes of the gyroscope 222.

The gyroscope 222 may sense rotation about three separate sensing axis, e.g., a first axis (x-axis), a second axis (y-axis) and a third axis (z-axis). Accordingly, the gyroscope 222 may output gyroscope signals 231 which include first axis gyroscope signals, second axis gyroscope signals, and third axis gyroscope signals, which are collectively shown in FIG. 3 as gyroscope signals 231[x, y, z].

The stationary detection circuitry 212 receives the first axis, the second axis, and the third axis gyroscope signals 231[x, y, z] output by the gyroscope 222 and determines whether the gyroscope 222 is stationary based on the received gyroscope signals 231[x, y, z]. The stationary detection circuitry 212 may determine whether the gyroscope 222 is stationary in substantially the same manner as previously described herein, for example, based on a comparison of the received gyroscope signals 231[x, y, z] with historical gyroscope data, statistical data, or the like. The stationary detection circuitry 212 may determine whether the gyroscope 222 is stationary by analyzing each of the first, second, and third gyroscope signals 231[x, y, z]. That is, each of the first, second, and third gyroscope signals 231[x, y, z] may be compared to the historical gyroscope data, statistical data, or the like to determine whether the gyroscope 222 is stationary.

The stationary detection circuitry 212 may determine whether the gyroscope 222 is stationary based further on accelerometer signals 41 received from an accelerometer 24 and/or based on signals 51 received from one or more additional sensors 26 as previously described herein.

In response to determining that the gyroscope 222 is stationary, the stationary detection circuitry 212 outputs a first axis stationary gyroscope signal 232[x], a second axis stationary gyroscope signal 232[y], and a third axis stationary gyroscope signal 233[z] to the ZRL estimation controller 218.

The ZRL estimation controller 218 includes a first axis ZRL estimation controller 218[x], a second axis ZRL estimation controller 218[y], and a third axis ZRL estimation controller 218[z]. The first axis ZRL estimation controller 218[x], the second axis ZRL estimation controller 218[y], and the third axis ZRL estimation controller 218[z] respectively receive the first axis stationary gyroscope signal 232[x], the second axis stationary gyroscope signal 232[y], and the third axis stationary gyroscope signal 232[z]. Additionally, each of the first, second, and third axis ZRL controllers 218[x], 218[y], 218[z] may receive the temperature signals 61.

Each of the first, second, and third axis ZRL controllers 218[x], 218[y], 218[z] may be substantially the same as the ZRL estimation controller 18 described herein with respect to FIG. 2, except that they operate based on output gyroscope signals for a particular sensing axis. For example, each of the first, second, and third axis ZRL controllers 218[x], 218[y], 218[z] may control updating of $\tilde{X}_i$ and $\tilde{Y}_i$ matrices for a respective one of the three sensing axes by respectively passing selected couples, e.g., first axis, second axis, and third axis stationary gyroscope signals 233[x], 233[y], 233[z] and their associated temperature signals 61.

Similarly, the ZRL estimation circuitry 214 includes first axis ZRL estimation circuitry 214[x], second axis ZRL estimation circuitry 214[y], and third axis ZRL estimation circuitry 214[z]. The first axis ZRL estimation circuitry 214[x], the second axis ZRL estimation circuitry 214[y], and the third axis ZRL estimation circuitry 214[z] respectively receive the first axis stationary gyroscope signal 233[x], the second axis stationary gyroscope signal 233[y], and the third axis stationary gyroscope signal 233[z], and their respectively associated temperature signals 63 which are provided from the ZRL estimation controller 218 as respective couples {g, t}.

Each of the first axis, second axis, and third axis ZRL estimation circuitries 214[x], 214[y], 214[z] may be substantially the same as the ZRL estimation circuitry 214 described herein with respect to FIG. 2, except that they operate based on output gyroscope signals for a particular sensing axis. Accordingly, each of the ZRL estimation circuitries generates and outputs respective zero-rate level compensation parameters 271[x], 271[y], 271[z] which are utilized by the gyroscope compensation circuitry 216 to compensate each of the first axis gyroscope signals, the second axis gyroscope signals, and third axis gyroscope signals 231[x, y, z] to obtain and output first axis, second axis, and third axis compensated gyroscope signals, collectively shown in FIG. 3 as compensated gyroscope signals 235[x, y, z].

Figure 4:
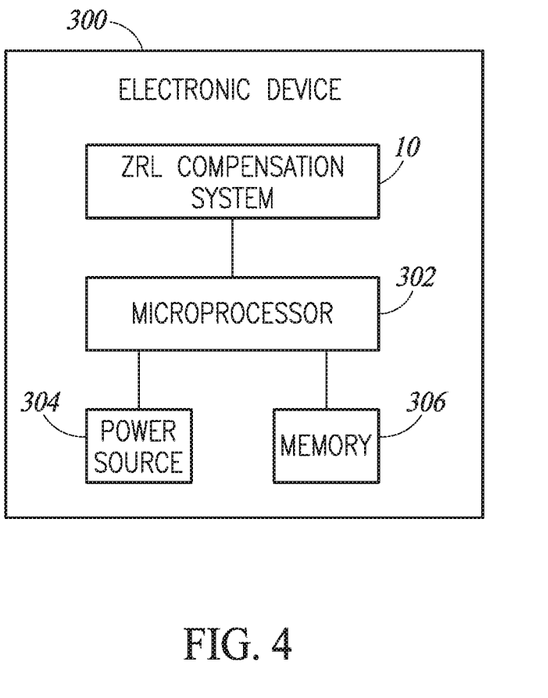
FIG. 4 is a functional block diagram illustrating an electronic device including a ZRL compensation system, in accordance with one or more embodiments of the present disclosure.

FIG. 4 is a functional block diagram illustrating an electronic device 300 including a ZRL compensation system coupled to a microprocessor 302. The ZRL compensation system may be any ZRL compensation system described herein, such as the ZRL compensation system 10, the ZRL compensation system 110, or the ZRL compensation system 210. The microprocessor 302 may be or include any circuitry configured to receive or send electrical signals to the ZRL compensation system 10, 110, or 210. The electronic device 300 may further include a power source 304 operable to supply electric power for the device 300. The power source 304, which may be a battery, may be coupled to the microprocessor 302. The electronic device 300 may include a memory 306 coupled to or incorporated in the microprocessor 302.

In one or more embodiments, the electronic device 300 may be a cell phone, smartphone, tablet computer, camera, augmented reality (AR) or virtual reality (VR) devices such as a headset, portable computing device and/or wearable computing device that may be located in clothing, shoes, watches, glasses or any other wearable structures. In some embodiments, the electronic device 300, or the ZRL compensation system 10, 110, or 210 itself, may be located in a vehicle, such as a boat, car, aircraft, unmanned aerial vehicle or drone, a robot, or any other moveable structure or machinery. The electronic device 300 may be utilized in automotive or navigation applications and/or circuitry, including in global navigation satellite system (GNSS) integrated circuits and dead reckoning applications.

The various embodiments provided herein facilitate dynamic updating of the zero-rate level compensation parameters, which allows for the gyroscope output calibration to be maintained (e.g., by the gyroscope compensation circuitry), even when a device is moving and even if the temperature is changing. Embodiments of the present disclosure may therefore provide very high accuracy in the calibrated gyroscope output, as compared to prior devices or systems, which is of particular utility in applications where gyroscope accuracy is needed or desired, including but not limited to attitude estimation applications, optical and/or electrical image stabilization, navigation applications, and more.

Additionally, one or more embodiments provided herein facilitate gyroscope calibration using only outputs from a gyroscope and a temperature sensor (e.g., without any kind of orientation sensor, Kalman filter, etc.) to calibrate the gyroscope over both temperature and time. Various embodiments can be implemented in a low power microcontroller and/or directly on silicon. Further, embodiments provided herein provide high accuracy gyroscope calibration with little or no cost, for example, as there are no or minimal costs associated with factory calibration, and no additional hardware costs as the various circuitry and algorithms provided herein may be implemented in hardware that may be commonly found in gyroscope devices.

The iterative solutions for estimating zero-rate level compensation parameters, as provided herein, may facilitate low-power operation of the systems and devices, as the parameters may be estimated and updated iteratively (e.g., one data point at a time), as opposed to collecting all data sets and then calculating based on a very large data set. Moreover, it is noted that embodiments provided herein may estimate zero-rate level compensation parameters with high accuracy even with relatively small data sets. For example, an experiment was conducted using just five measurements (five couples {g, t}), with the temperatures of each measurement being different by 10° C. with respect to a previous measurement. The experiment confirmed that the calibrated gyroscope output achieved an average accuracy of 99.65% in both slope and intercept estimates (the compensation parameters for a linear regression model). The amount of temperature spread between measurements may impact the number of couples {g, t} needed to provide a certain accuracy. Therefore, for low temperature spread applications, a higher number of couples {g, t} may be needed in order to achieve a same accuracy as in a high temperature spread application.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a gyroscope;
stationary detection circuitry which, in use:
receives gyroscope signals output by the gyroscope,
determines whether the gyroscope is stationary based on the gyroscope signals, and
generates a stationary gyroscope signal based on a determination that the gyroscope is stationary;
a temperature sensor which, in use, senses temperature and outputs temperature signals;
zero-rate level estimation circuitry which, in use, receives the stationary gyroscope signal and a temperature signal associated with the stationary gyroscope signal, and iteratively estimates one or more zero-rate level compensation parameters based on the stationary gyroscope signal and the temperature signal; and
a zero-rate level estimation controller coupled between the stationary detection circuitry and the zero-rate level estimation circuitry, wherein the zero-rate level estimation controller, in use:
receives the stationary gyroscope signal,
receives the temperature signal associated with the stationary gyroscope signal,
determines whether the temperature signal represents a change in temperature which exceeds a threshold amount, and
selectively outputs the stationary gyroscope signal and the temperature signal to the zero-rate level estimation circuitry only in response to determining the temperature signal represents a change in temperature which exceeds the threshold amount.

2. The system of claim 1, comprising:
gyroscope compensation circuitry which, in use, receives the gyroscope signals output by the gyroscope and compensates the gyroscope signals based on the one or more zero-rate level compensation parameters.

3. The system of claim 1 wherein the stationary detection circuitry, the zero-rate level estimation circuitry, and the zero-rate level estimation controller are embedded in a microcontroller unit.

4. The system of claim 1 wherein the zero-rate level estimation controller, in use:
stores the stationary gyroscope signal and the associated temperature signal in a buffer.

5. The system of claim 4 wherein the zero-rate level estimation controller, in use:
receives a new stationary gyroscope signal,
receives a new temperature signal associated with the new stationary gyroscope signal,
determines whether the new temperature signal represents a temperature that is within a threshold range with respect to a prior temperature signal stored in the buffer, and
outputs the new stationary gyroscope signal and the new temperature signal to the zero-rate level estimation circuitry in response to determining that the new temperature signal represents a temperature within the threshold range.

6. The system of claim 5 wherein the zero-rate level estimation controller, in use:
deletes from the buffer the prior temperature signal and a prior stationary gyroscope signal associated with the prior temperature signal, in response to determining that the new temperature signal represents a temperature within the threshold range.

7. The system of claim 1 wherein the zero-rate level estimation circuitry, in use, implements an iterative least square regression algorithm to iteratively estimate the one or more zero-rate level compensation parameters.

8. The system of claim 1, comprising at least one of an accelerometer, a magnetometer, or a global navigation satellite system (GNSS) sensor coupled to the stationary detection circuitry.

9. The system of claim 1 wherein:
the gyroscope is a tri-axial gyroscope, and the gyroscope signals include first axis gyroscope signals, second axis gyroscope signals, and third axis gyroscope signals;
the stationary detection circuitry, in use:
  receives the first axis, the second axis, and the third axis gyroscope signals output by the gyroscope,
  determines whether the gyroscope is stationary based on the first axis, the second axis, and the third axis gyroscope signals, and
  generates a first axis, a second axis, and a third axis stationary gyroscope signal based on a determination that the gyroscope is stationary; and
the zero-rate level estimation circuitry includes:
  first axis zero-rate level estimation circuitry which, in use, receives the first axis stationary gyroscope signal and the temperature signal, and estimates one or more first axis zero-rate level compensation parameters based on the first axis stationary gyroscope signal and the temperature signal,
  second axis zero-rate level estimation circuitry which, in use, receives the second axis stationary gyroscope signal and the temperature signal, and estimates one or more second axis zero-rate level compensation parameters based on the second axis stationary gyroscope signal and the temperature signal, and
  third axis zero-rate level estimation circuitry which, in use, receives the third axis stationary gyroscope signal and the temperature signal, and estimates one or more third axis zero-rate level compensation parameters based on the third axis stationary gyroscope signal and the temperature signal.

10. The system of claim 9, comprising:
gyroscope compensation circuitry which, in use, receives the first axis, the second axis, and the third axis gyroscope signals output by the gyroscope and compensates the first axis, the second axis, and the third axis gyroscope signals based on the one or more first axis, the one or more second axis, and the one or more third axis zero-rate level compensation parameters, respectively.

11. The system of claim 10, comprising:
a first axis zero-rate level estimation controller coupled between the stationary detection circuitry and the first axis zero-rate level estimation circuitry, the first axis zero-rate level estimation controller, in use:
  receives the first axis stationary gyroscope signal,
  receives the temperature signal,
  determines whether the temperature signal represents a change in temperature which exceeds a threshold amount, and
  outputs the first axis stationary gyroscope signal and the temperature signal to the first axis zero-rate level estimation circuitry in response to determining the temperature signal represents a change in temperature which exceeds the threshold amount;
a second axis zero-rate level estimation controller coupled between the stationary detection circuitry and the second axis zero-rate level estimation circuitry, the second axis zero-rate level estimation controller, in use:
  receives the second axis stationary gyroscope signal,
  receives the temperature signal,
  determines whether the temperature signal represents a change in temperature which exceeds a threshold amount, and
  outputs the second axis stationary gyroscope signal and the temperature signal to the second axis zero-rate level estimation circuitry in response to determining the temperature signal represents a change in temperature which exceeds the threshold amount; and
a third axis zero-rate level estimation controller coupled between the stationary detection circuitry and the third axis zero-rate level estimation circuitry, the third axis zero-rate level estimation controller, in use:
  receives the third axis stationary gyroscope signal,
  receives the temperature signal,
  determines whether the temperature signal represents a change in temperature which exceeds a threshold amount, and
  outputs the third axis stationary gyroscope signal and the temperature signal to the third axis zero-rate level estimation circuitry in response to determining the temperature signal represents a change in temperature which exceeds the threshold amount.

12. A method, comprising:
receiving gyroscope signals from a gyroscope;
receiving temperature signals from a temperature sensor;
associating the temperature signals with the gyroscope signals;
determining whether the gyroscope is stationary based on the gyroscope signals;
generating a stationary gyroscope signal in response to determining that the gyroscope is stationary;
iteratively estimating, by zero-rate level estimation circuitry, one or more zero-rate level compensation parameters based on the stationary gyroscope signal and a temperature signal associated with the stationary gyroscope signal;
receiving, by a zero-rate level estimation controller, the stationary gyroscope signal and the temperature signal associated with the stationary gyroscope signal, the zero-rate level estimation controller coupled between the stationary detection circuitry and the zero-rate level estimation circuitry;
determining whether the temperature signal associated with the stationary gyroscope signal represents a change in temperature which exceeds a threshold amount; and
selectively outputting the stationary gyroscope signal and the temperature signal to the zero-rate level estimation circuitry only in response to determining the temperature signal represents a change in temperature which exceeds the threshold amount.

13. The method of claim 12, comprising:
compensating the gyroscope signals based on the one or more zero-rate level parameters.

14. The method of claim 12, comprising:
storing the stationary gyroscope signal and the associated temperature signal in a buffer;
receiving, by the zero-rate level estimation controller, a new stationary gyroscope signal and a new temperature signal associated with the new stationary gyroscope signal;
determining whether the new temperature signal represents a temperature that is within a threshold range of a temperature represented by the temperature signal stored in the buffer; and
outputting the new stationary gyroscope signal and the new temperature signal to the zero-rate level estimation circuitry in response to determining that the new temperature signal represents a temperature within the threshold range.

15. The method of claim 14, comprising:
deleting the stationary gyroscope signal and the associated temperature signal from the buffer.

16. The method of claim 12 wherein the associating the temperature signals with the gyroscope signals includes timestamping the temperature signals and the gyroscope signals.

17. A device, comprising:
a microprocessor; and
a zero-rate level compensation system coupled to the microprocessor, the zero-rate level compensation system including:
stationary detection circuitry which, in use:
receives gyroscope signals output by a gyroscope,
determines whether the gyroscope is stationary based on the gyroscope signals, and
generates a stationary gyroscope signal based on a determination that the gyroscope is stationary;
a temperature sensor which, in use, senses temperature and outputs temperature signals;
zero-rate level estimation circuitry which, in use,
receives the stationary gyroscope signal and a temperature signal associated with the stationary gyroscope signal, and iteratively estimates one or more zero-rate level compensation parameters based on the stationary gyroscope signal and the temperature signal; and
a zero-rate level estimation controller coupled between the stationary detection circuitry and the zero-rate level estimation circuitry, wherein the zero-rate level, estimation controller, in use:
receives the stationary gyroscope signal,
receives the temperature signal associated with the stationary gyroscope signal,
determines whether the temperature signal represents a change in temperature which exceeds a threshold amount, and
selectively outputs the stationary gyroscope signal and the temperature signal to the zero-rate level estimation circuitry only in response to determining the temperature signal represents a change in temperature which exceeds the threshold amount.

18. The device of claim 17 wherein the zero-rate level compensation system includes the gyroscope.

19. The device of claim 17 wherein the device is at least one of a cell phone, a smartphone, a tablet computer, a camera, an augmented reality headset, a virtual reality headset, a portable computing device, a wearable computing device, a vehicle, an unmanned aerial vehicle, and a robot.

20. A device, comprising:
one or more computer-readable memories; and
zero-rate level compensation circuitry coupled to the one or more computer-readable memories, wherein the zero-rate level compensation circuitry, in operation:
receives, by stationary detection circuitry, gyroscope signals from a gyroscope;
associates the temperature signals with the gyroscope signals;
determines whether the gyroscope is stationary based on the gyroscope signals;
generates, by the stationary detection circuitry, a stationary gyroscope signal in response to determining that the gyroscope is stationary;
receives, by a zero-rate level estimation controller coupled between the stationary detection circuitry and zero-level estimation circuitry, the stationary gyroscope signal;
receives, by the zero-rate level estimation controller, temperature signals from a temperature sensor, the temperature signals associated with the gyroscope signals;
determines, by the zero-rate level estimation controller, whether the temperature signal represents a change in temperature which exceeds a threshold amount;
outputs, by the zero-rate level estimation controller, the stationary gyroscope signal and the temperature signal to the zero-rate level estimation circuitry only in response to determining the temperature signal represents a change in temperature which exceeds the threshold amount; and
iteratively estimates, by the zero-rate level estimation circuitry, one or more zero-rate level compensation parameters based on the stationary gyroscope signal and a temperature signal associated with the stationary gyroscope signal.

21. The device of claim 20 wherein, in operation, the zero-rate level compensation circuitry compensates the gyroscope signals based on the one or more zero-rate level parameters.

* * * * *